(12) United States Patent (10) Patent No.: US 8,516,376 B2
Dias et al. (45) Date of Patent: Aug. 20, 2013

(54) IDENTIFICATION SYSTEM FOR NETWORK DATA PROCESSING SYSTEMS

(75) Inventors: Daniel Manuel Dias, Mohegan Lake, NY (US); Claude Alexander Greengard, Chappaqua, NY (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/788,457

(22) Filed: May 27, 2010

(65) Prior Publication Data

US 2011/0296311 A1 Dec. 1, 2011

(51) Int. Cl.
*G06F 15/177* (2006.01)

(52) U.S. Cl.
USPC ............ 715/736; 715/853; 715/735; 709/209

(58) Field of Classification Search
USPC .......................... 715/736, 853, 735; 709/227
See application file for complete search history.

(56) References Cited

U.S. PATENT DOCUMENTS

| | | | | |
|---|---|---|---|---|
| 4,319,130 A | * | 3/1982 | Spitzner | 341/75 |
| 5,650,799 A | * | 7/1997 | Melen | 345/172 |
| 5,821,937 A | * | 10/1998 | Tonelli et al. | 715/853 |
| 5,831,610 A | * | 11/1998 | Tonelli et al. | 715/735 |
| 6,418,425 B1 | * | 7/2002 | Maeda et al. | 706/47 |
| 8,000,736 B2 | * | 8/2011 | Forstall et al. | 455/550.1 |
| 2003/0061225 A1 | * | 3/2003 | Bowman et al. | 707/100 |
| 2003/0065600 A1 | * | 4/2003 | Terashima et al. | 705/36 |
| 2004/0070624 A1 | * | 4/2004 | Fushimi et al. | 345/771 |
| 2005/0093866 A1 | * | 5/2005 | Ebert | 345/440 |
| 2005/0187967 A1 | * | 8/2005 | Couch et al. | 707/102 |
| 2007/0024490 A1 | * | 2/2007 | Carter et al. | 342/36 |
| 2008/0167071 A1 | * | 7/2008 | Forstall et al. | 455/556.2 |
| 2008/0215508 A1 | * | 9/2008 | Hanneman et al. | 706/11 |
| 2010/0031166 A1 | * | 2/2010 | Choudhary et al. | 715/760 |
| 2011/0055713 A1 | * | 3/2011 | Gruenewald et al. | 715/738 |
| 2011/0058202 A1 | * | 3/2011 | St. Jacques et al. | 358/1.13 |
| 2011/0145099 A1 | * | 6/2011 | Berger et al. | 705/27.1 |
| 2011/0252382 A1 | * | 10/2011 | Bhaskaran et al. | 715/853 |
| 2011/0296311 A1 | * | 12/2011 | Dias et al. | 715/736 |

* cited by examiner

*Primary Examiner* — Steven Sax
*Assistant Examiner* — David Choi
(74) *Attorney, Agent, or Firm* — Yee & Associates, P.C.; Louis J. Percello

(57) ABSTRACT

Identifying changes between network data processing systems is provided. A first number of attributes for a network data processing system are identified by a processor unit. A second number of attributes for a number of potential network data processing systems are identified by the processor unit. A graphical user interface with a graphical representation of a comparison of the first number of attributes and the second number of attributes is displayed on a display device.

10 Claims, 12 Drawing Sheets

IDENTIFICATION SYSTEM FOR NETWORK DATA PROCESSING SYSTEMS

BACKGROUND

1. Field

The disclosure relates generally to an improved data processing system and, more specifically, to a method and apparatus for identifying changes to a network data processing system. Still more specifically, the present disclosure relates to a method and apparatus for identifying changes to a network data processing system using a graphical user interface.

2. Description of the Related Art

Network data processing systems are used for a variety of purposes. Organizations use network data processing systems to perform business and information technology functions. For example, an organization may offer services, such as software development, consulting services, products for sale, and other suitable services. Additionally, network data processing systems also are used by various users to obtain information, communicate with other users, purchase goods and services, and other types of uses.

Over time, hardware and software in a network data processing system may need updates, maintenance, replacement, and/or other changes. Further, in some cases, the structure of the network data processing system may be changed or replaced with another network data processing system.

For example, in a network data processing system, server computers in the network data processing system may be replaced or upgraded using new server computers. This type of change includes a number of different processes. The new server computers are connected to the network, and software and data are loaded onto the network computers. The service is provided by the current server computers and are migrated or moved over to the new server computers.

As another example, the changes to the network data processing system may include moving the network data processing system from one type of environment to another type of environment. For example, a current network data processing system may use servers and infrastructures owned and managed by an organization. Another network environment may involve a cloud network data processing system.

In selecting the type of changes to a network data processing system, an organization may consider a number of different factors. For example, an organization may consider factors, such as cost, security, ability to recover from failures in the network, speed of processing requests, and other factors. The particular factors considered by an organization may depend on the needs and requirements of the organization. As a result, different organizations may select different types of network data processing systems.

SUMMARY

A method, data processing system, and computer program product are provided for identifying network data processing systems. A first number of attributes for a network data processing system are identified by a processor unit. A second number of attributes for a number of potential network data processing systems are identified by the processor unit. A graphical user interface with a graphical representation of a comparison of the first number of attributes and the second number of attributes is displayed on a display device.

DETAILED DESCRIPTION

Figure 1:
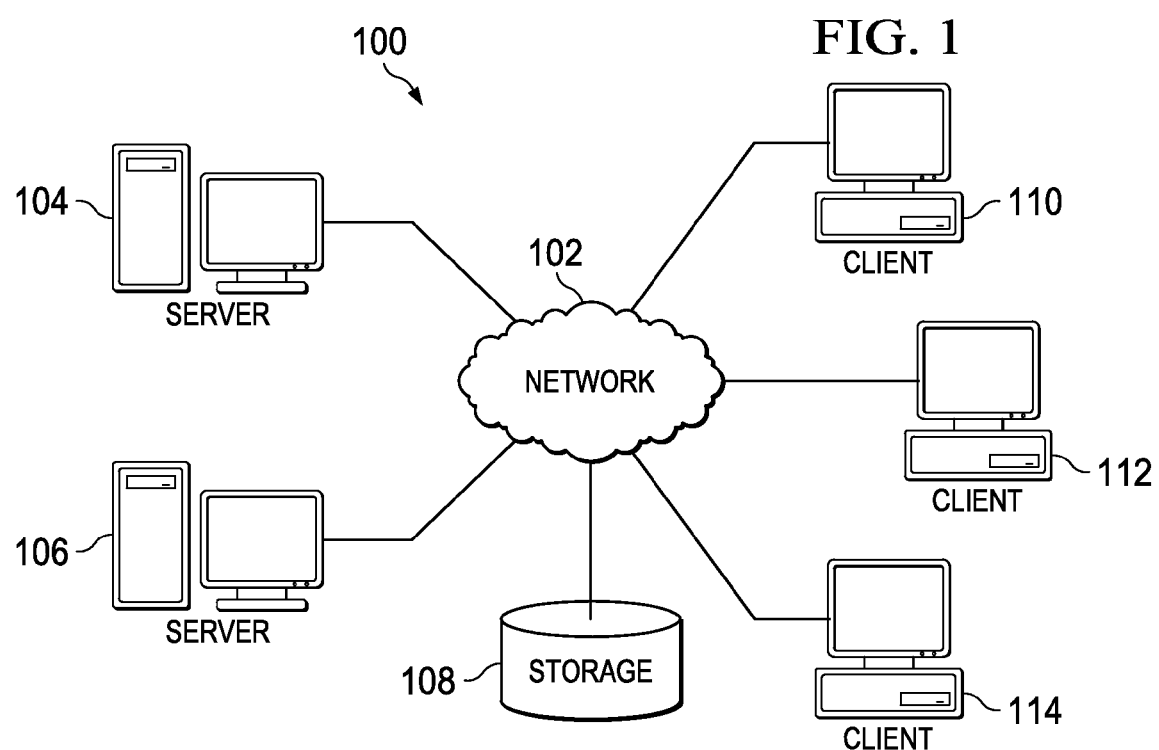
FIG. 1 is a diagram of a data processing environment in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction process system, apparatus, or device. The computer usable medium may include a propagated data signal with the computer usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, a diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

One or more of the illustrative embodiments may be implemented using computers in network data processing system 100. Additionally, the different illustrative embodiments may be used to identify changes to network data processing system 100 for an organization. The different illustrative embodiments may run as processes on one or more computers within network data processing system 100.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
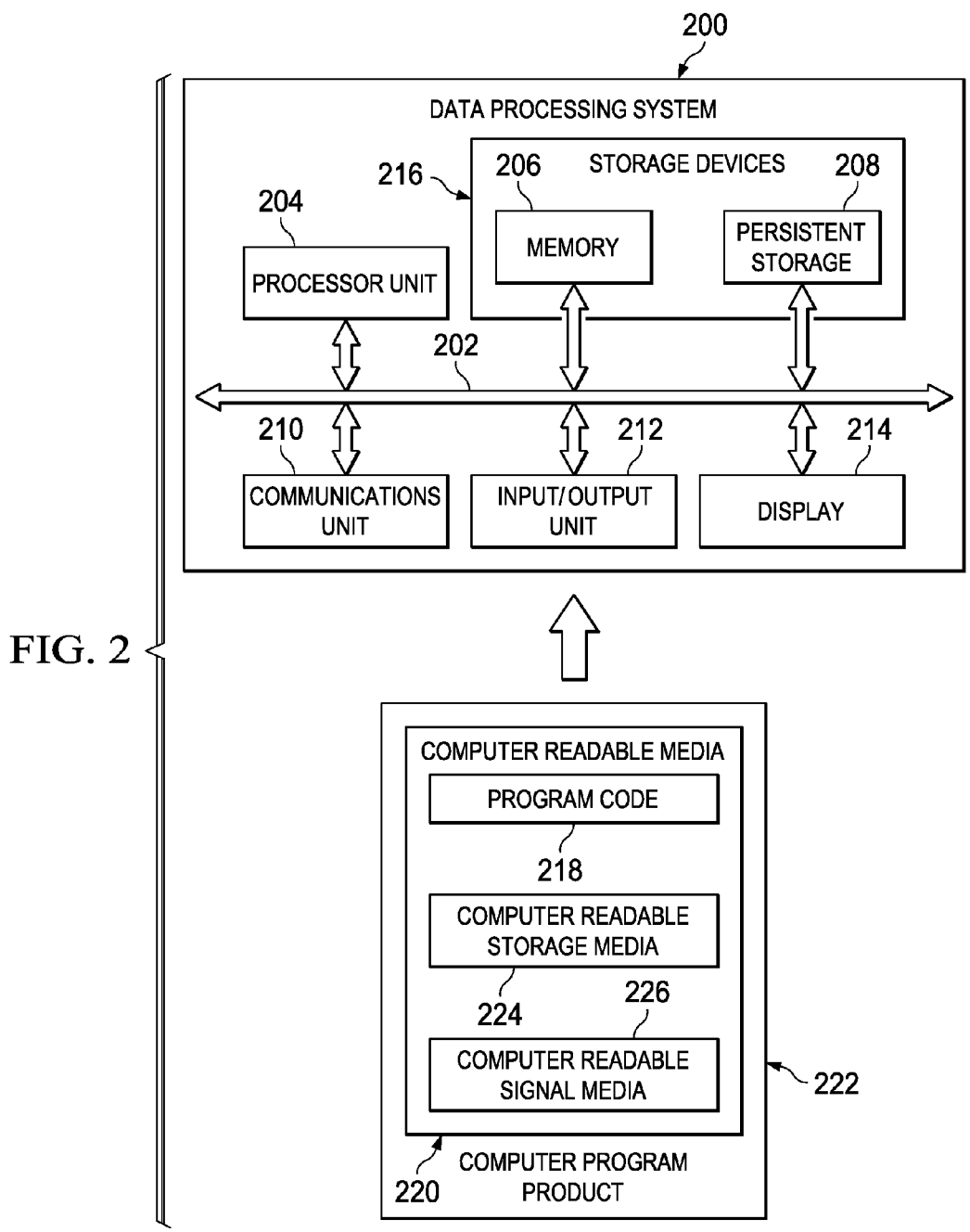
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Data processing system 200 is an example of a data processing system that may be used to implement different computers in network data processing system 100 in FIG. 1. For example, data processing system 200 may be used to implement server computer 104 and server computer 106. Further, data processing system 200 also may be used to implement client computers 110, 112, and 114 in FIG. 1.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for processing by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for processing by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

The different illustrative embodiments take into account and recognize a number of different considerations. For example, in identifying changes to make to a network data processing system, an organization typically considers cost as a factor. The illustrative embodiments also recognize and take into account that other considerations often should be taken into account by organizations. The different illustrative embodiments recognize and take into account that different types of network data processing systems may have different advantages. For example, although cost may be one consideration, changes in efficiency between the current network data processing system and a new network data processing system may be another attribute to consider in selecting changes to the network data processing system. Further, the different illustrative embodiments also recognize and take into account that as additional attributes about different network data processing systems are considered, the amount of information to be considered by an organization may increase such that these different attributes may become more difficult to consider.

Thus, the different illustrative embodiments provide a method and apparatus for identifying changes between network data processing systems. A first number of attributes for a network data processing system is identified. Additionally, a second number of attributes for a number of potential network data processing systems is identified. A graphical user interface with a graphical representation of the first number of attributes and the second number of attributes is displayed.

Figure 3:
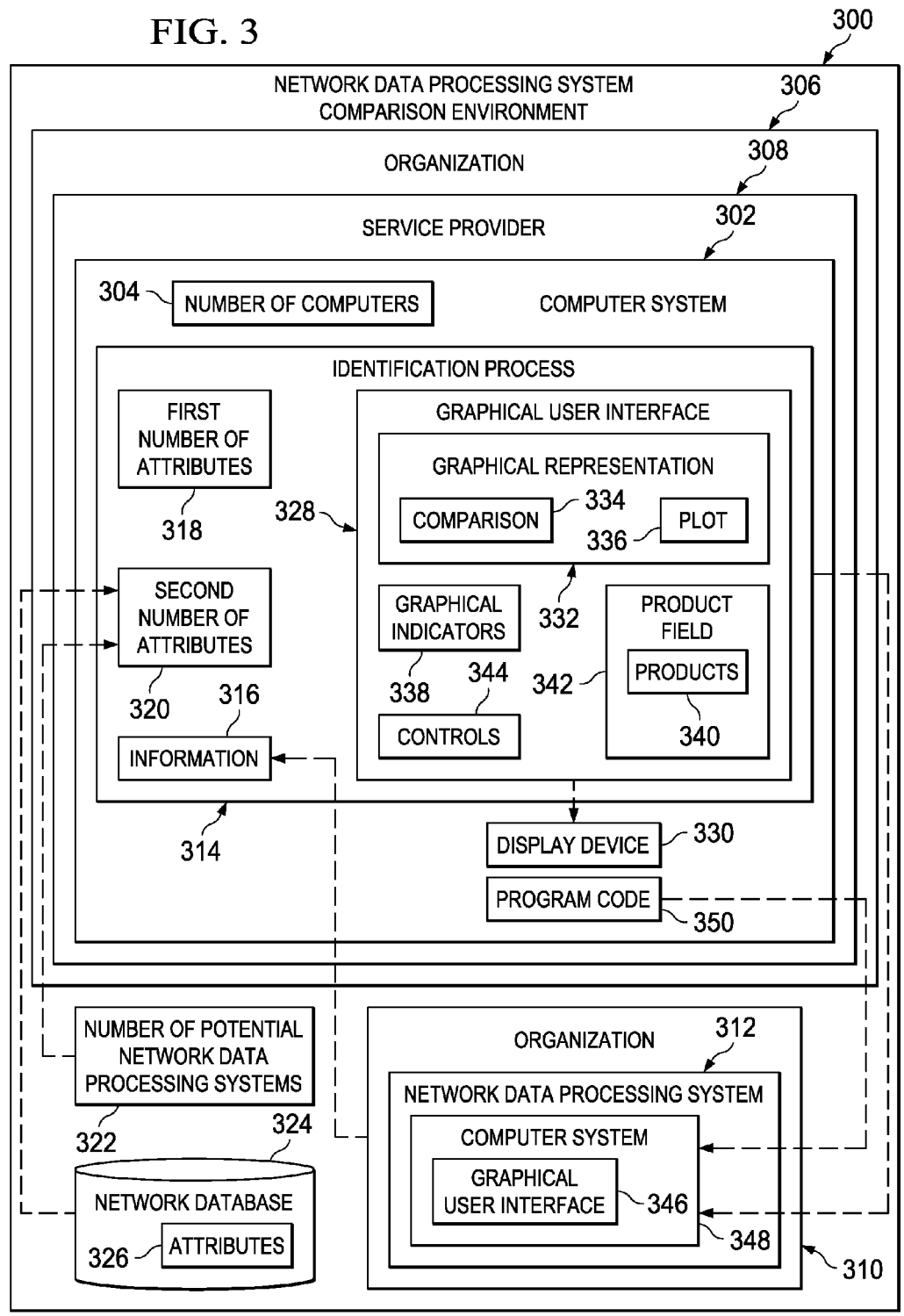
FIG. 3 is an illustration of a network data processing system comparison environment in accordance with an illustrative embodiment.

With reference now to FIG. 3, an illustration of a network data processing system comparison environment is depicted in accordance with an illustrative embodiment. In this example, network data processing system comparison environment 300 may be implemented using computer system 302. Computer system 302 includes number of computers 304 or a portion of network data processing system 100 in FIG. 1. Computer system 302 may take the form of network data processing system 100 in FIG. 1. In some illustrative examples, computer system 302 may be a single data processing system, such as data processing system 200 in FIG. 2.

Computer system 302 is in organization 306 in this depicted example. Organization 306, in this example, may be service provider 308. Service provider 308 may provide consulting services to organization 310. More specifically, service provider 308 may provide consulting information about network data processing system 312 used by organization 310. Organization 310 is a client to service provider 308. Organization 310 may be, for example, without limitation, a financial institution, a healthcare provider, a non-profit organization, a manufacturing company, a distributor, a software development company, a city, a government branch, or any other suitable type of entity or organization.

In these illustrative examples, identification process 314 runs on computer system 302. Identification process 314 receives information 316 from organization 310. Information 316 may include information about network data processing system 312 and information about requirements or needs for organization 310. In these illustrative examples, information 316 may be, for example, identification of hardware and software in network data processing system 312. Information 316 also may include information about processes or tasks performed in organization 310, as well as requirements for those processes or tasks.

In these illustrative examples, information 316 is used to identify first number of attributes 318 for network data processing system 312. Additionally, identification process 314 also may identify second number of attributes 320 for number of potential network data processing systems 322. Second number of attributes 320 is present for each of number of potential network data processing systems 322 in these examples. Second number of attributes 320 may be obtained from network database 324. Network database 324 may include attributes 326 for different network data processing systems. Further, second number of attributes 320 for number of potential network data processing systems 322 may be obtained from attributes 326.

In these illustrative examples, number of potential network data processing systems 322 may take a number of different forms. For example, without limitation, number of potential network data processing systems 322 may comprise at least one of a public cloud, a private cloud, a cloud for special purpose services, an in-house network data processing system, a high-availability network data processing system, a business continuity and resiliency network data processing system, a remotely managed network data processing system, a third party managed network data processing system, and other suitable types of data processing systems.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

For example, network data processing system 312 may be owned and managed by organization 310. Number of potential network data processing systems 322 may include structural changes to network data processing system 312. These structural changes may include, for example, new servers, clients, a different network and/or sub-net structure, or other suitable changes. Additionally, number of potential network data processing systems 322 may include other types of network data processing systems.

For example, a cloud is a network data processing system in which resources and different services used by organization 310 are provided through the Internet. A public cloud is a cloud in which resources are shared by different organizations. A private cloud is a cloud in which security and resources, such as storage, may emulate those found on network data processing system 312.

In some cases, number of potential network data processing systems 322 may include a network data processing system for network data processing system 312 in which network data processing system 312 is owned and/or located at organization 310 but managed through an external service. Of course, these examples are only meant as some examples of the different types of network data processing systems that may be considered in number of potential network data processing systems 322.

In the different illustrative examples, identification process 314 includes graphical user interface 328, which is displayed on display device 330 in computer system 302. Graphical user interface 328 includes graphical representation 332. Graphical representation 332 includes comparison 334 of first number of attributes 318 for network data processing system 312 and second number of attributes 320 for number of potential network data processing systems 322. Comparison 334 is based on a comparison of first number of attributes 318 and second number of attributes 320.

In particular, graphical representation 332 includes plot 336. Plot 336 is a graphical representation of information relating to first number of attributes 318 and second number of attributes 320. Graphical user interface 328 also may present at least one of first number of attributes 318 and second number of attributes 320 using graphical indicators 338.

Additionally, information about products 340 may be presented using graphical user interface 328. Products 340 may include products and services that may be offered for a particular network data processing system. In particular, information about products 340 may be presented using product field 342 in graphical user interface 328. Further, graphical user interface 328 may include controls 344. Controls 344 are graphical controls that may be used to receive user input to make changes in the selection of number of potential network data processing systems 322.

In the different illustrative examples, identification process 314 also may be used to compare network data processing systems not currently in use by organization 310 with each other. For example, two or more network data processing systems from network database 324 may be selected for comparison with each other. Network data processing system 312, in this case, would be one selected by user input rather than one currently in use. As another example, two or more network data processing systems in number of potential network data processing systems 322 may be selected for comparison with each other.

In this manner, organization 310 may make decisions about network data processing system 312. Further, identification process 314 may be used by service provider 308 to provide services to organizations without a network data processing system. For example, identification process 314 may be used to select from different network data processing systems that may be used by an organization.

The illustration of network data processing system comparison environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in these illustrative examples, graphical user interface 328 may be presented on display device 330 located in computer system 302. In some illustrative examples, identification process 314 may run on computer system 302 and generate graphical user interface 346 on computer system 348 in network data processing system 312 at organization 310. With this type of implementation, graphical user interface 346 may be presented using a browser in computer system 348. As another example, in some illustrative embodiments, a request for comparisons may be made by organization 310. In response, service provider 308 may send program code 350 to computer system 348. Program code 350 is for running identification process 314 on computer system 348.

Figure 4:
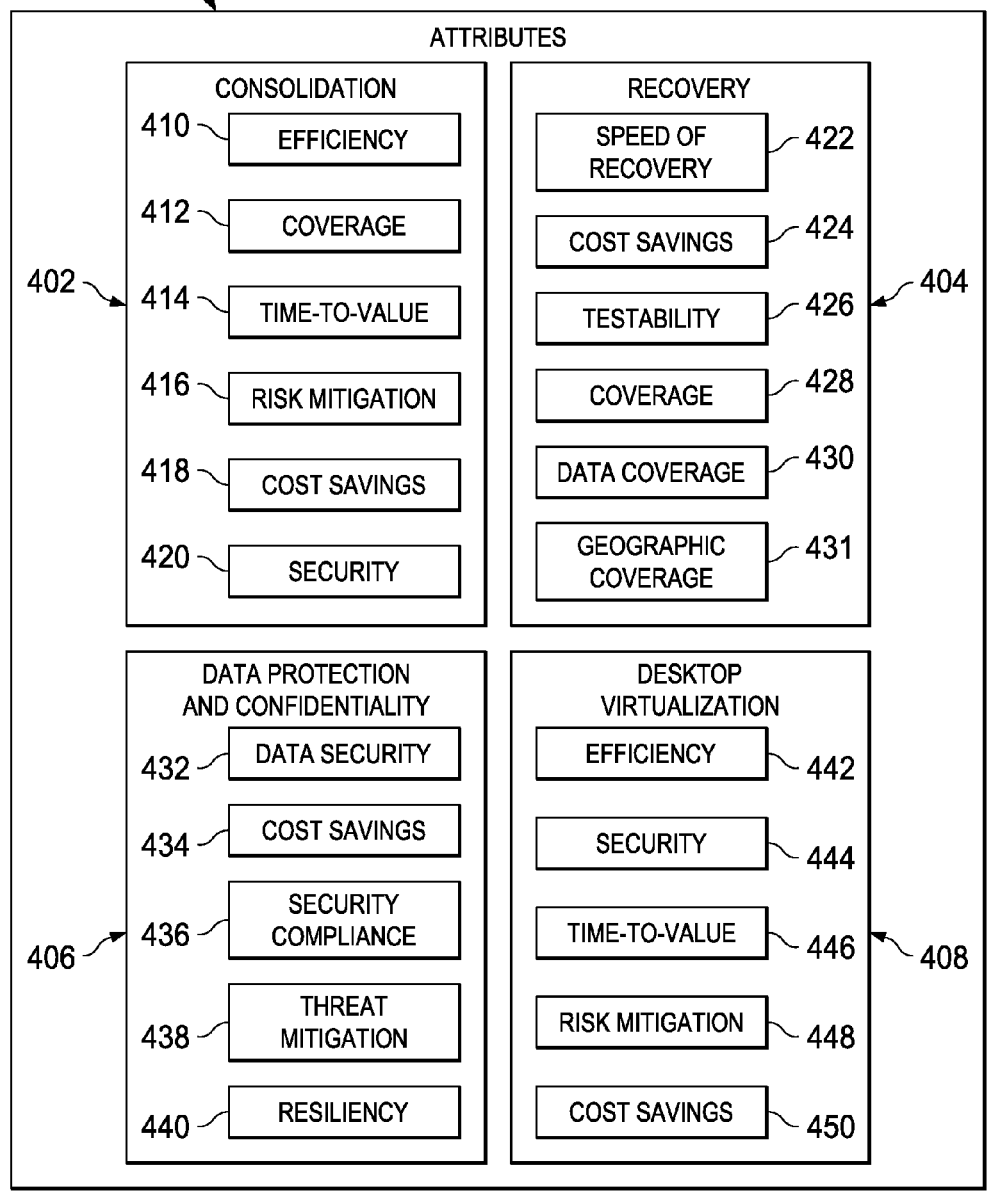
FIG. 4 is an illustration of attributes in accordance with an illustrative embodiment.

With reference now to FIG. 4, an illustration of attributes is depicted in accordance with an illustrative embodiment. Attributes 400 are examples of attributes that may be found in first number of attributes 318 and second number of attributes 320 in FIG. 3. As illustrated, attributes 400 may vary, depending on the goal for the network data processing system. In these examples, four categories are illustrated. These categories include consolidation 402, recovery 404, data protection and confidentiality 406, and desktop virtualization 408.

In this illustrative example, consolidation 402 is the goal for a network data processing system to reduce a total number of physical servers in use by an organization, such as organization 310 in FIG. 3. Recovery 404 is the goal for a network data processing system to recover data processing capabilities in the case of servers not operating as desired and/or other undesired effects on the network data processing system.

Data protection and confidentiality 406 is the goal for a network data processing system to provide protection of data from unauthorized use and loss. Further, data protection and confidentiality 406 is the goal for a network data processing system to maintain confidentiality of data such that confidential data is not made available to unauthorized users. Desktop virtualization 408 is the goal for a network data processing system to provide desktop services from one location to a number of locations virtually. In this manner, multiple users may not need to install and/or maintain individual desktop services on individual computers.

Each goal is characterized by a number of attributes. For example, with consolidation 402, efficiency 410, coverage 412, time-to-value 414, risk mitigation 416, cost savings 418, and security 420 are examples of attributes that are considered for this type of goal. With recovery 404, attributes include speed of recovery 422, cost savings 424, testability 426, coverage 428, data coverage 430, and geographic coverage 431.

With data protection and confidentiality 406, attributes include data security 432, cost savings 434, security compliance 436, threat mitigation 438, and resiliency 440. With desktop virtualization 408, attributes include efficiency 442, security 444, time-to-value 446, risk mitigation 448, and cost savings 450.

The attribute of efficiency is a measure of how effective a particular network data processing system is in achieving the goal. For example, efficiency 410 may measure how effective a network data processing system is in achieving consolidation 402. The attribute of coverage measures the range of systems, tasks, functions, and/or processes covered by a particular network data processing system in achieving the goal.

The attribute of time-to-value is a measure of the time at which the first benefits of a change to a particular network data processing system may be achieved. The time-to-value attribute takes into account the time and effort needed for planning, designing, implementing, testing, and/or performing other suitable operations needed to make a change to a network data processing system.

The attribute of risk mitigation measures the ability to manage, control, and/or reduce risks associated with a change to a particular network data processing system. The attribute of cost savings measures the costs associated with a particular network data processing system compared to the costs associated with an existing network data processing system.

The attribute of security measures the ability to maintain confidentiality of the processes and functions associated with a network data processing system. The attribute of speed of recovery measures how quickly processes, functionality, and/or data may be recovered when using a particular network data processing system. The attribute of testability measures the ability to test and verify that the processes, functionality, and/or data associated with a network data processing system can be recovered within a guaranteed period.

The attribute of data coverage measures the range of data that is covered by a network data processing system. For example, data coverage 430 in recovery 404 measures the range of data that may be recovered with a particular network data processing system. The attribute of geographic coverage measures the number of locations, such as operations centers, that may be covered by a network data processing system distributed among the locations. For example, geographic coverage 431 in recovery 404 measures the number of locations for which processes, functionality, and/or data for a network data processing system may be recovered.

The attribute of data security is a measure of the amount and/or type of data that is protected and kept confidential with a particular network data processing system. The attribute of security compliance measures the extent to which a particular network data processing system provides security and/or confidentiality of data in compliance with rules, regulations, legal policies, accounting policies, audit-related mandates, and/or other suitable factors.

The attribute of threat mitigation measures the ability to control and reduce threats to the network data processing system, data stored in the network data processing system, and/or processes running on the network data processing system. Threats may include, for example, viruses, unauthorized program codes, spyware, and/or other suitable types of threats. The attribute of resiliency measures the ability to recover to a desired state for a network data processing system after the network data processing system has been subjected to unexpected conditions and/or unexpected changes.

The illustration of attributes 400, in this example, is only provided as an example of some attributes that may be used in the different illustrative embodiments. In other embodiments, other types of attributes may be used in addition to or in place of the ones depicted. Further, in some cases, attributes may not be grouped based on goals. Instead, attributes may be based on particular requirements identified for an organization. For example, some attributes found in data protection and confidentiality 406 and consolidation 402 may be used rather than for particular types of goals.

With reference now to FIGS. 5-10, illustrations of a graphical user interface are depicted in accordance with an illustrative embodiment. In this illustrative example, graphical user interface 500 in FIGS. 5-10 is an example of one implementation of graphical user interface 328 in FIG. 3.

Figure 5:
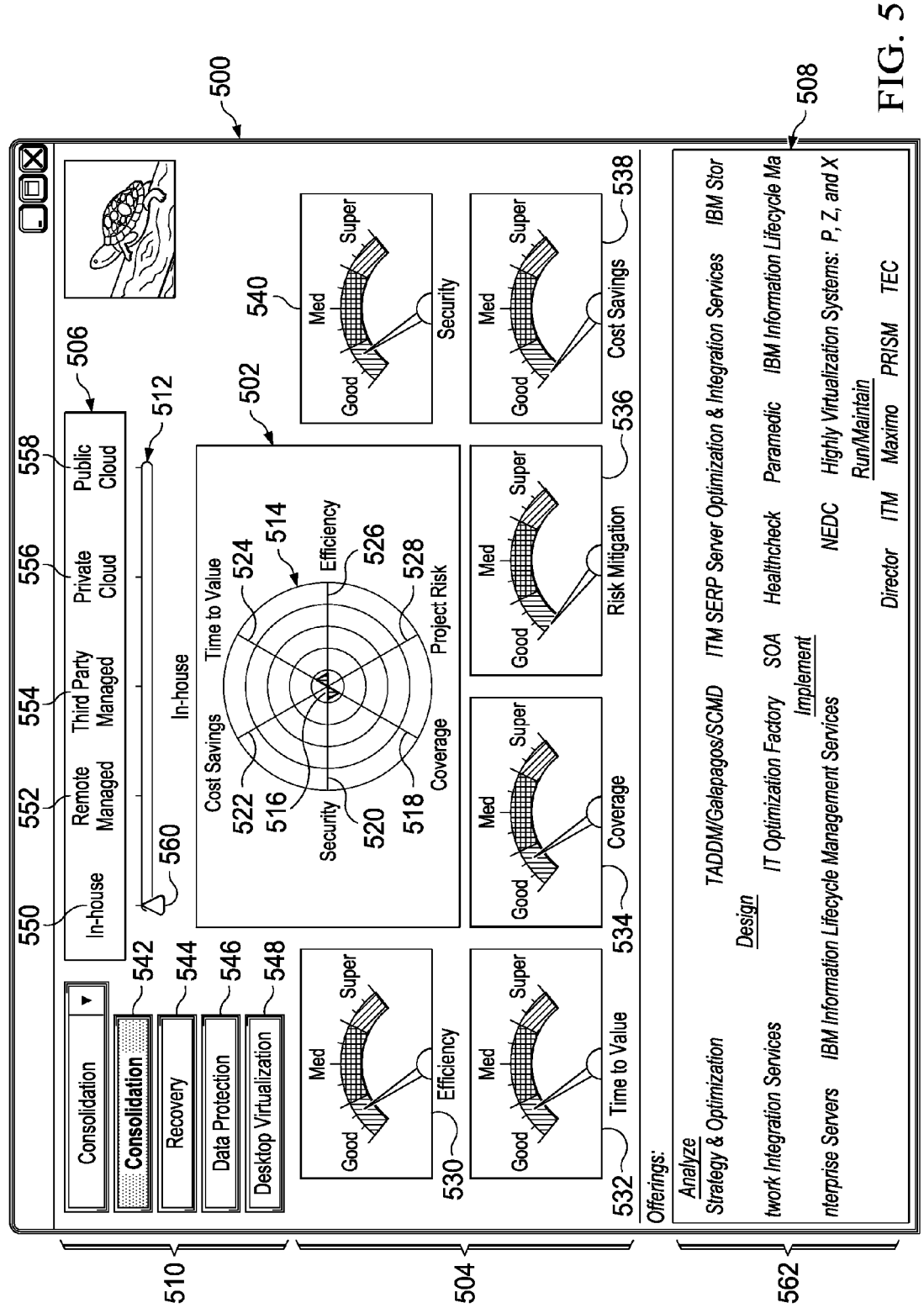
FIG. 5 is an illustration of a graphical user interface in accordance with an illustrative embodiment.

Turning now to FIG. 5, an illustration of graphical user interface 500 is depicted in accordance with an illustrative embodiment. As illustrated, graphical user interface 500 includes plot field 502, graphical indicators 504, network data processing system field 506, products offered field 508, goal menu 510, and graphical control 512.

In this illustrative example, plot field 502 may present plot 514. Plot 514 is a plot or graph on which different attributes for different network data processing systems may be presented. In this example, plot 514 takes the form of a radar plot. Plot 514 has center 516 and lines 518, 520, 522, 524, 526, and 528. These lines represent different attributes for a network data processing system. In these examples, center 516 represents a zero value for the attributes represented by lines 518, 520, 522, 524, 526, and 528 in plot 514. The value for the attributes increases in directions away from center 516.

Further, each of lines 518, 520, 522, 524, 526, and 528 correspond to one of meters 530, 532, 534, 536, 538, and 540 within graphical indicators 504. Meters 530, 532, 534, 536, 538, and 540 also correspond to attributes for the network data processing system. Each of meters 530, 532, 534, 536, 538, and 540 in graphical indicators 504 presents a value for the attributes for the network data processing system.

Goal menu 510 may be used to select a type of comparison. These comparisons may be based on goals, such as those illustrated for attributes 400 in FIG. 4. In this example, goal menu 510 includes consolidation 542, recovery 544, data protection and confidentiality 546, and desktop virtualization 548 as entries that may be selected. Selection of a particular entry identifies attributes that may be presented in plot field 502 and through graphical indicators 504. In this illustrative example, consolidation 542 is selected from goal menu 510.

Network data processing system field 506 illustrates different network data processing systems that may be considered. In this example, the selections include in-house 550, remote managed 552, third party managed 554, private cloud 556, and public cloud 558. In this illustrative example, in-house 550 may be the network data processing system selected as a default when consolidation 542 is selected from goal menu 510. As depicted, plot 514 illustrates a plot for in-house 550.

In these illustrative examples, the type of network data processing system may be selected by using graphical control 512 to select the particular network data processing system displayed in network data processing system field 506. Additionally, graphical control 512 takes the form of slider 560, which may be moved to select different network data processing systems within network data processing system field 506. By moving slider 560 under a particular network data processing system, that network data processing system may be selected for use in comparisons of attributes. Additionally, meters 530, 532, 534, 536, 538, and 540 present values for the different attributes for in-house 550. These values may also be used in comparing the attributes for the different network data processing systems.

Products offered field 508 displays list of products 562 that may be offered for the network data processing system selected within network data processing system field 506. For example, when in-house 550 is selected as the network data processing system for consolidation 542, products offered field 508 displays list of products 562 that may be offered for in-house 550. List of products 562 may also include products and services to transform the existing network data processing system to the selected data processing system within network data processing system field 506.

In these illustrative examples, a product in list of products 562 may be selected within products offered field 508. When a product is selected, a window may be displayed on graphical user interface 500 to present information for the product selected. For example, without limitation, a webpage containing information for the product may be displayed. In another example, a document containing technical specifications for the product may be displayed. In yet another example, a website for the manufacturer of the product may be displayed.

Figure 6:
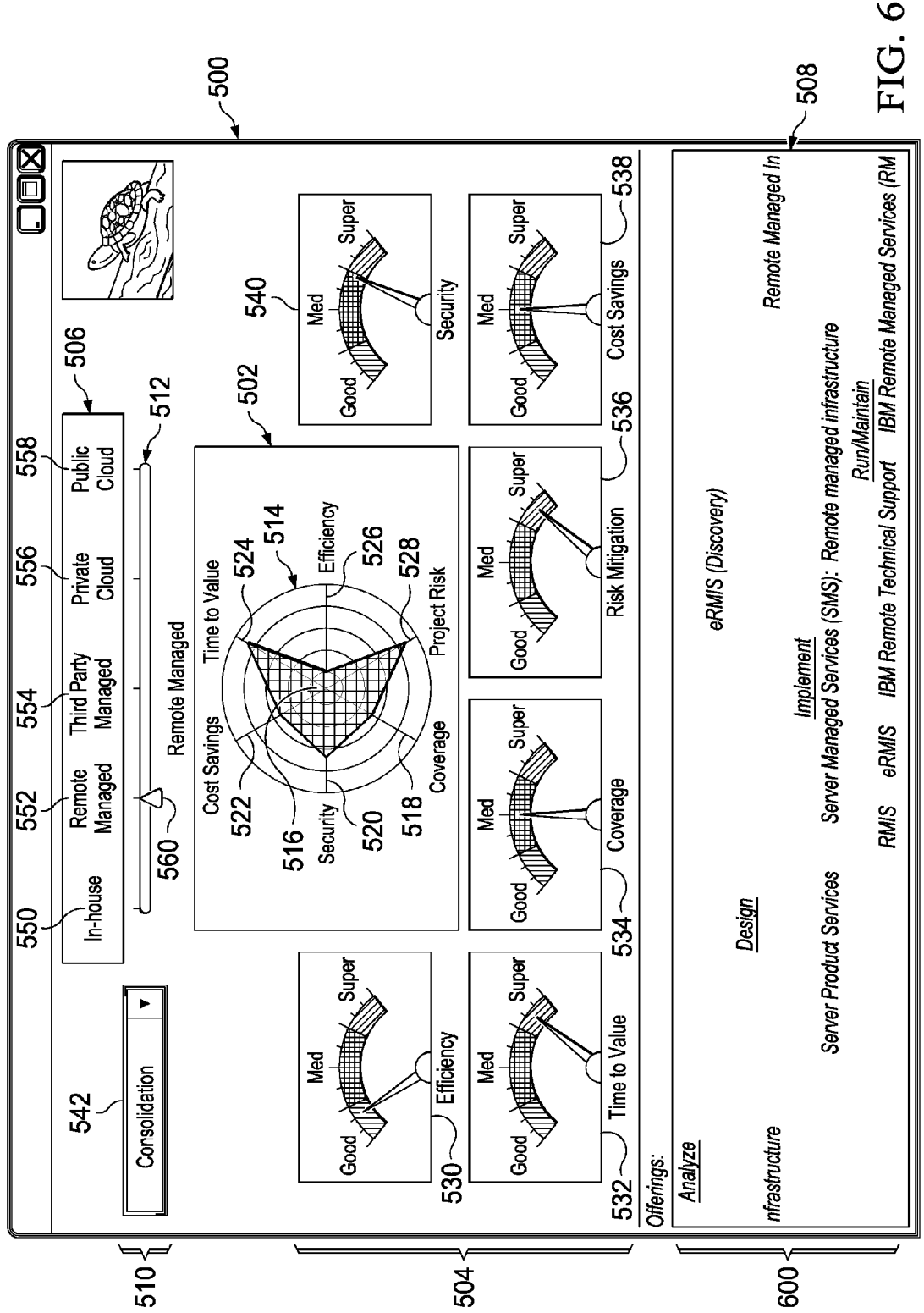
FIG. 6 is an illustration of a graphical user interface in accordance with an illustrative embodiment.

With reference now to FIG. 6, an illustration of graphical user interface 500 is depicted in accordance with an illustrative embodiment. In this illustrative example, consolidation 542 is selected from goal menu 510. Further, remote managed 552 is selected within network data processing system field 506 using slider 560.

As illustrated, plot 514 illustrates a plot for remote managed 552. Meters 530, 532, 534, 536, 538, and 540 present values for the different attributes for remote managed 552. In this illustrative example, plot 514 and meters 530, 532, 534, 536, 538, and 540 present greater values for some or all of the attributes for remote managed 552 as compared to in-house 550. Additionally, products offered field 508 displays list of products 600 that may be offered for remote managed 552.

Figure 7:
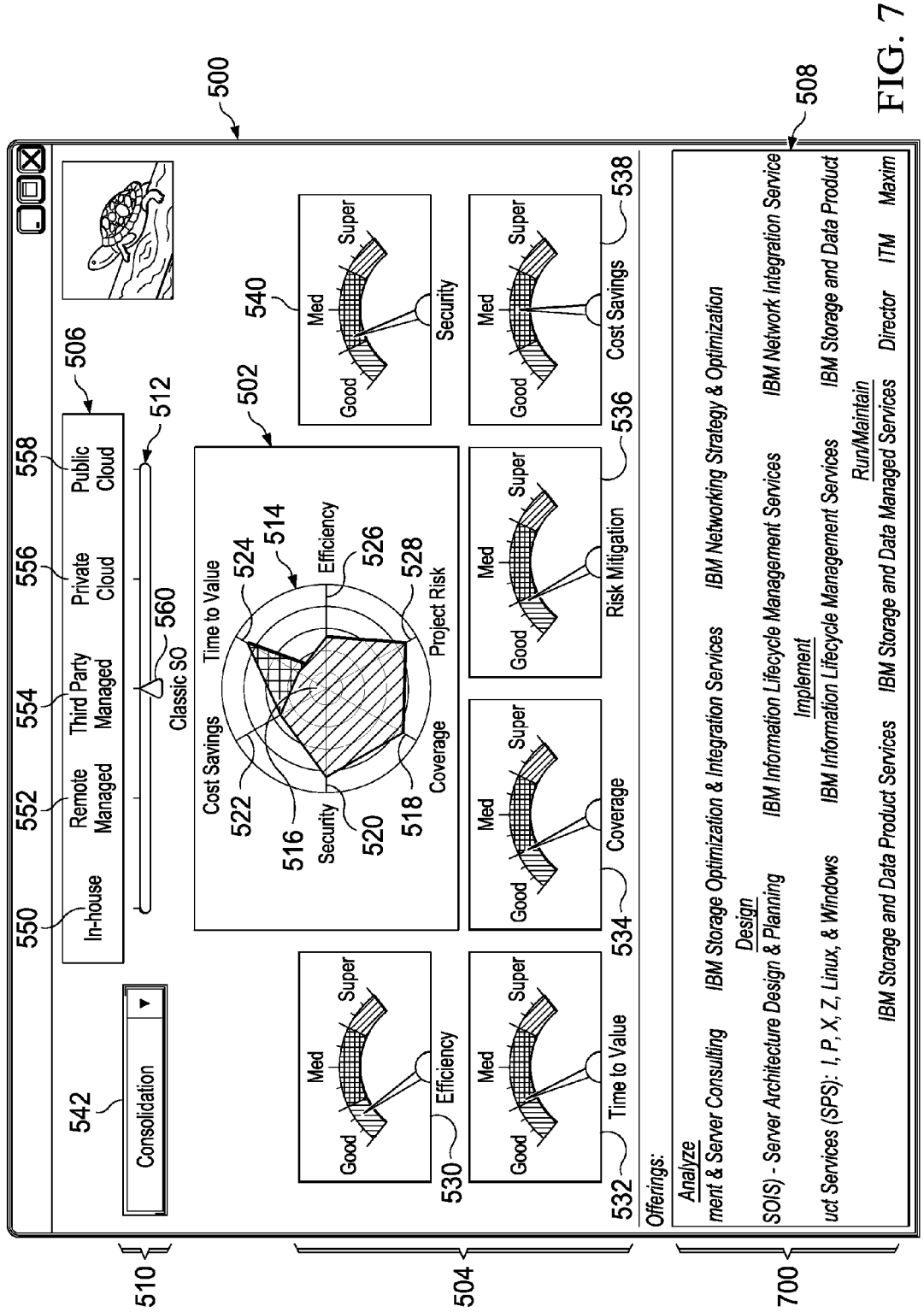
FIG. 7 is an illustration of a graphical user interface in accordance with an illustrative embodiment.

With reference now to FIG. 7, an illustration of graphical user interface 500 is depicted in accordance with an illustrative embodiment. In this illustrative example, consolidation 542 is selected from goal menu 510. Further, third party managed 554 is selected within network data processing system field 506 using slider 560.

As illustrated, plot 514 illustrates a plot for third party managed 554. The plot for third party managed 554 is displayed over of the plot for remote managed 552 as displayed in plot 514 in FIG. 6. In this manner, plot 514 may be used to compare the plot for third party managed 554 and the plot for remote managed 552 to compare the attributes for the different network data processing systems.

Meters 530, 532, 534, 536, 538, and 540 present values for the different attributes for third party managed 554. Additionally, products offered field 508 displays list of products 700 that may be offered for third party managed 554. In this illustrative example, products offered field 508 and meters 530, 532, 534, 536, 538, and 540 may be for the network data processing system selected within network data processing system field 506.

Figure 8:
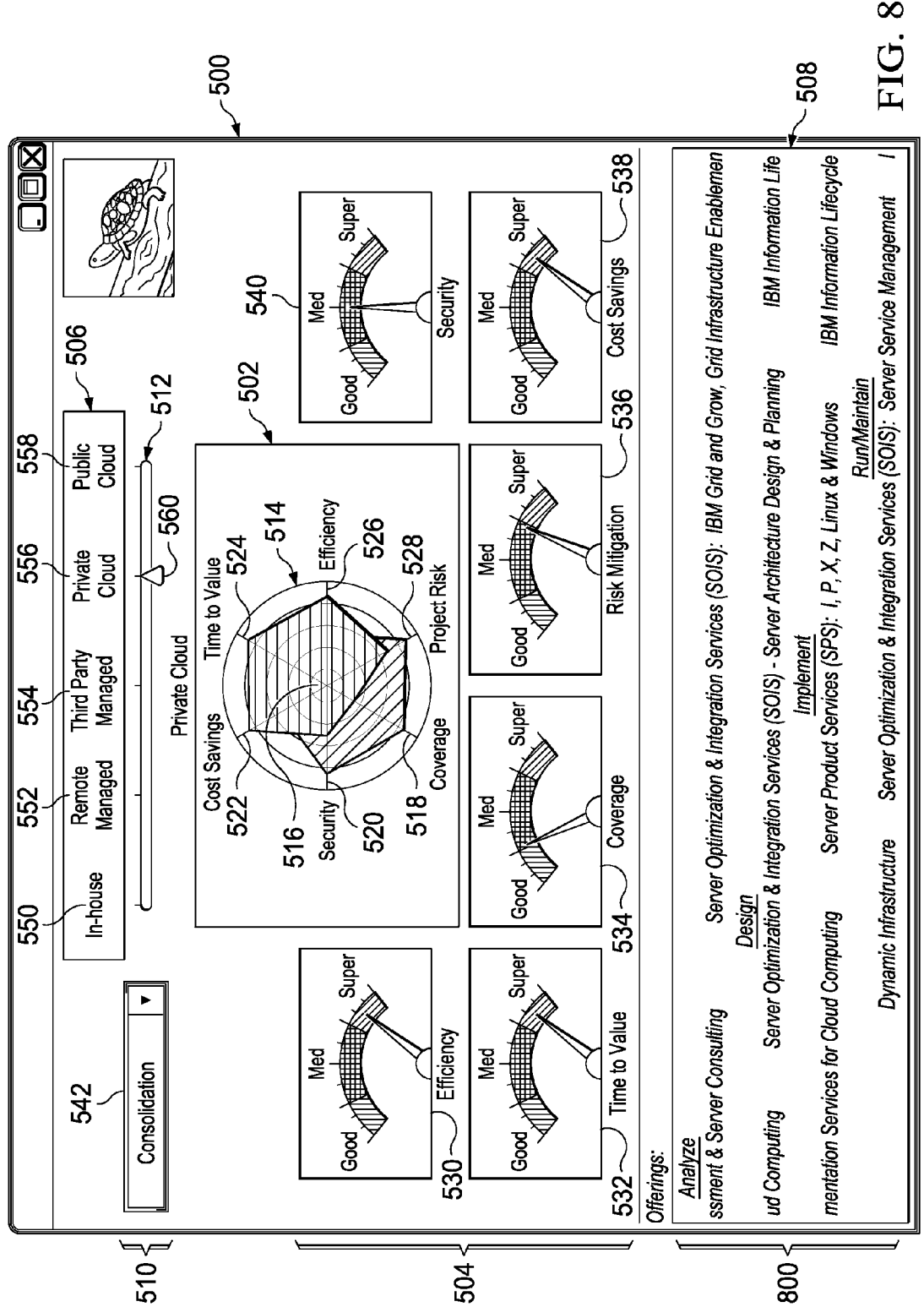
FIG. 8 is an illustration of a graphical user interface in accordance with an illustrative embodiment.

With reference now to FIG. 8, an illustration of graphical user interface 500 is depicted in accordance with an illustrative embodiment. In this illustrative example, consolidation 542 is selected from goal menu 510. Further, private cloud 556 is selected within network data processing system field 506 using slider 560.

As illustrated, plot 514 illustrates a plot for private cloud 556. The plot for private cloud 556 is displayed over plot for third party managed 554 as displayed in plot 514 in FIG. 7. In this manner, plot 514 may be used to compare the plot for private cloud 556 and the plot for third party managed 554 to compare the attributes for the different network data processing systems.

Meters 530, 532, 534, 536, 538, and 540 present values for the different attributes for private cloud 556. Additionally, products offered field 508 displays list of products 800 that may be offered for private cloud 556.

Figure 9:
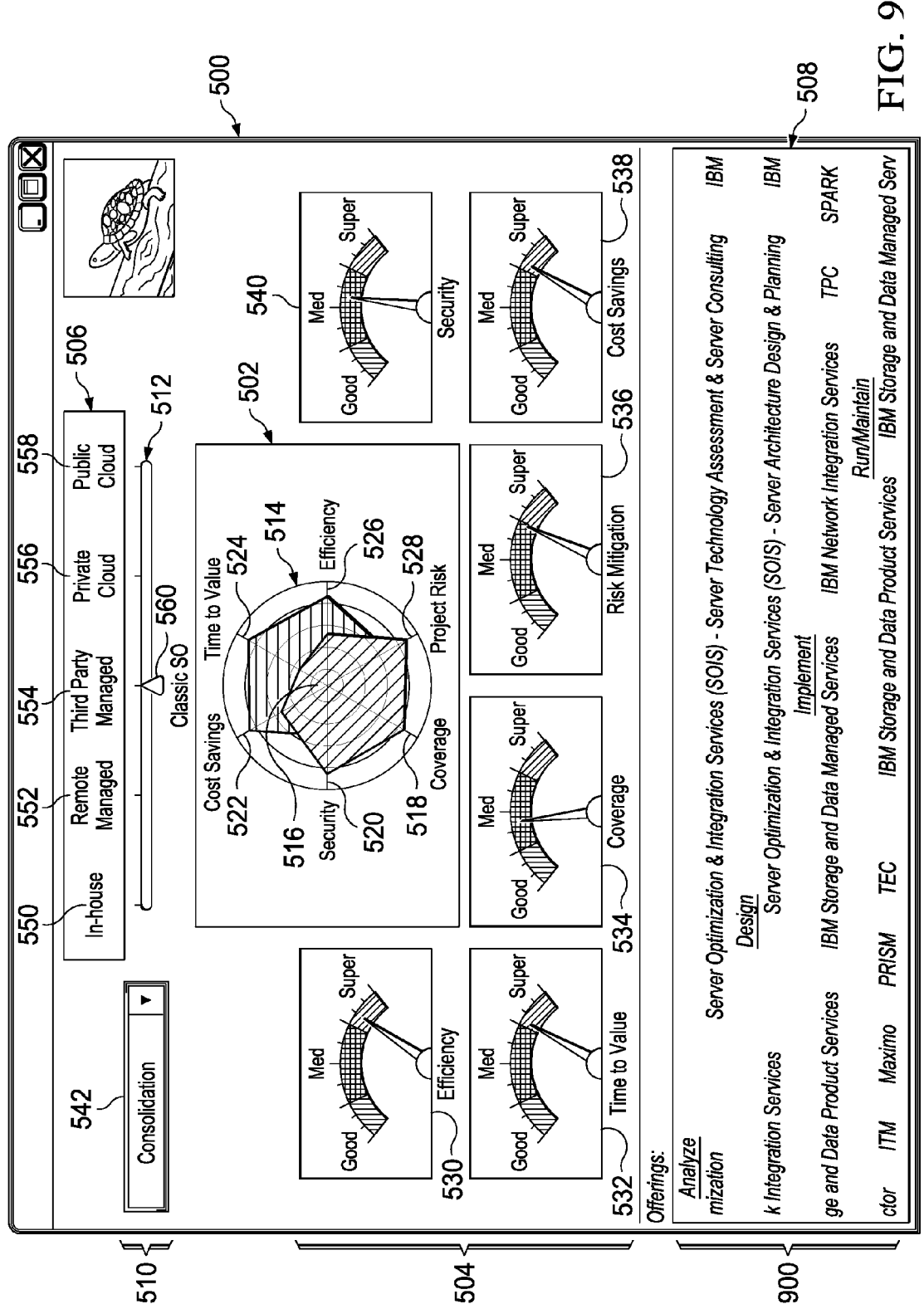
FIG. 9 is an illustration of a graphical user interface in accordance with an illustrative embodiment.

With reference now to FIG. 9, an illustration of graphical user interface 500 is depicted in accordance with an illustrative embodiment. In this illustrative example, consolidation 542 is selected from goal menu 510. Further, third party managed 554 is selected within network data processing system field 506 using slider 560. As depicted, plot 514 presents a plot for third party managed 554 over the plot for private cloud 556.

Meters 530, 532, 534, 536, 538, and 540 present values for the different attributes for third party managed 554. Additionally, products offered field 508 displays list of products 900 that may be offered for third party managed 554.

Figure 10:
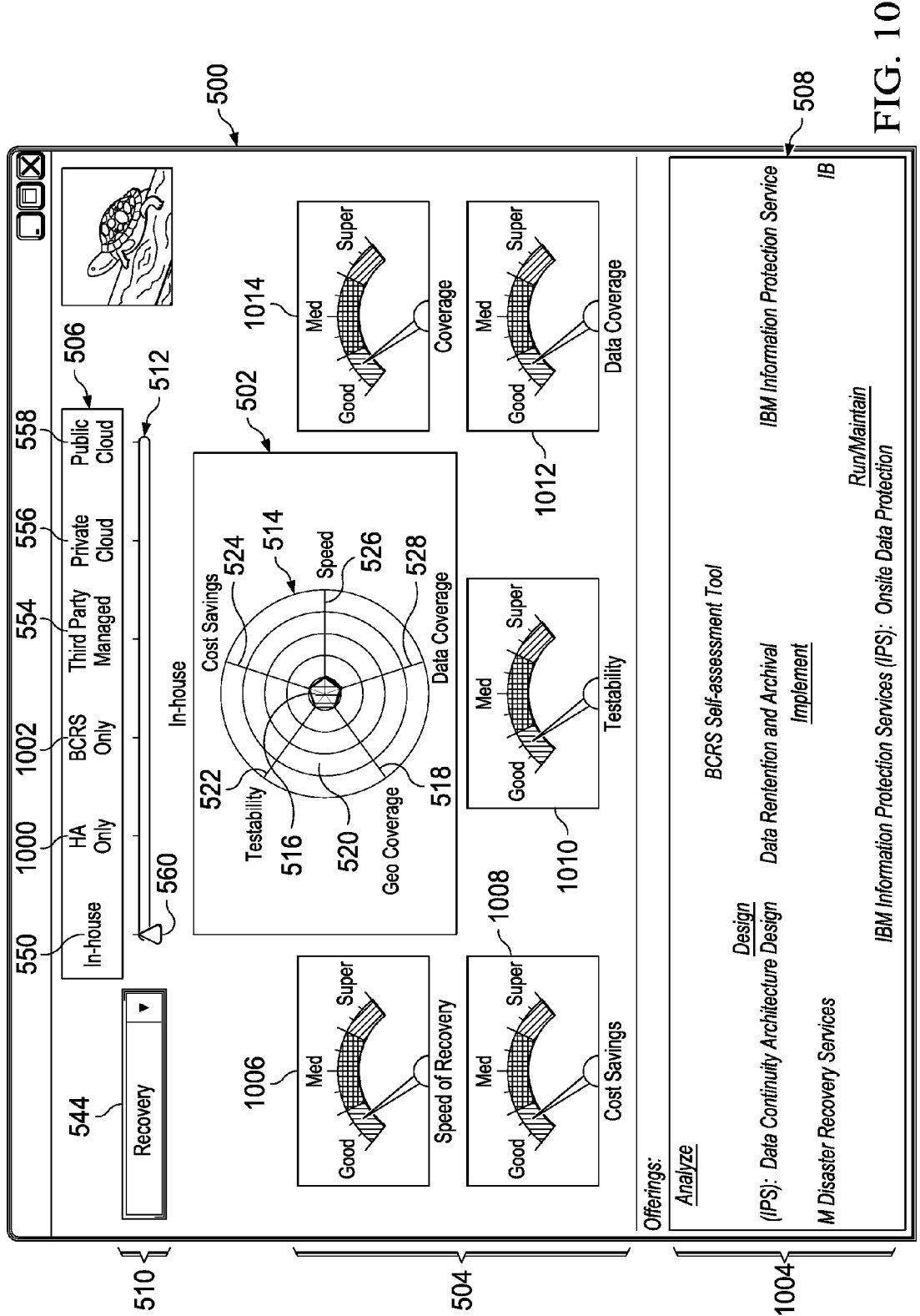
FIG. 10 is an illustration of a graphical user interface in accordance with an illustrative embodiment.

With reference now to FIG. 10, an illustration of graphical user interface 500 is depicted in accordance with an illustrative embodiment. In this illustrative example, recovery 544 is selected from goal menu 510. When recovery 544 is selected from goal menu 510, a different set of network data processing systems are presented in network data processing system field 506 as compared to the network data processing systems presented for consolidation 542 in FIGS. 5-9.

As illustrated, network data processing system field 506 presents in-house 550, high availability 1000, business continuity and resiliency system 1002, third party managed 554, private cloud 556, and public cloud 558. High availability 1000 includes a backup server for every server in the network data processing system. Business continuity and resiliency system 1002 monitors for changes to the servers in the network data processing system and updates the network data processing system when a change occurs for any of the servers.

As depicted, in-house 550 is the default network data processing system selected when recovery 544 is selected from goal menu 510. Meters 1006, 1008, 1010, 1012, and 1014 present values for the different attributes for in-house 550. Additionally, products offered field 508 displays list of products 1004 that may be offered for in-house 550.

In this illustrative example, graphical indicators 504 include meters for different attributes in recovery 544 as compared to the meters for the different attributes in consolidation 542 in FIGS. 5-9. As depicted, graphical indicators 504 include meters 1006, 1008, 1010, 1012, and 1014. Each of these meters presents a value for an attribute in recovery 544.

The illustrations of graphical user interface 500 in FIGS. 5-10 are not meant to imply physical or architectural limitations to the manner in which different illustrative embodiments may be implemented. Other components in addition to and/or in place of the ones illustrated may be used. Some components may be unnecessary in some illustrative embodiments.

Figure 11:
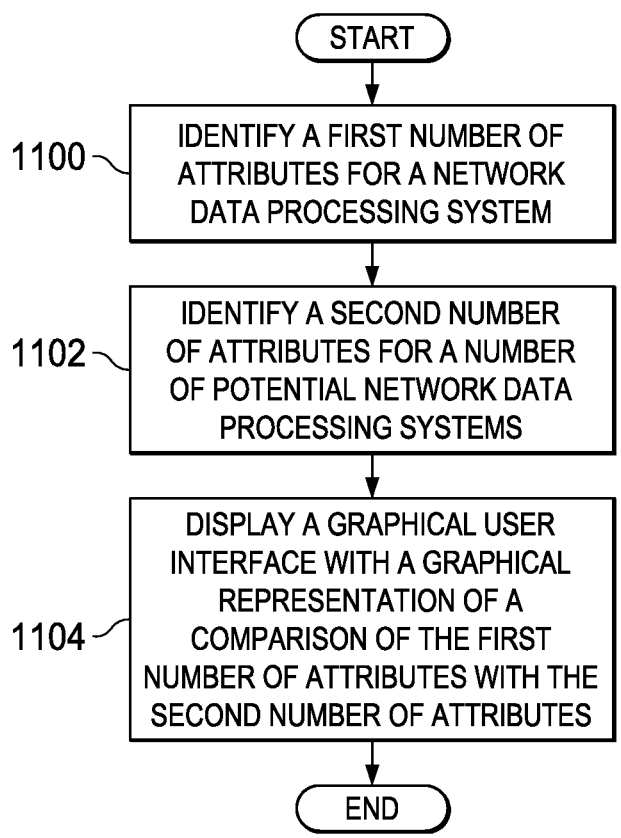
FIG. 11 is an illustration of a flowchart of a process for identifying network data processing systems in accordance with an illustrative embodiment.

With reference now to FIG. 11, an illustration of a flowchart of a process for identifying network data processing systems is depicted in accordance with an illustrative embodiment. The process illustrated in FIG. 11 may be implemented in identification process 314 in FIG. 3. In particular, the different steps illustrated in FIG. 11 may be implemented in program code that is run by data processing system 200 in FIG. 2.

The process begins by identifying a first number of attributes for a network data processing system (step 1100). In this example, the network data processing system may be a current network data processing system in use or a potential network data processing system that is being considered. Further, the network data processing system may be for an organization, such as organization 310 in FIG. 3. The first number of attributes may be identified from attributes, such as attributes 400 in FIG. 4.

The process then identifies a second number of attributes for a number of potential network data processing systems (step 1102). The second number of attributes may also be identified from attributes, such as attributes 400 in FIG. 4.

Thereafter, the process displays a graphical user interface with a graphical representation of a comparison of the first number of attributes with the second number of attributes (step 1104), with the process terminating thereafter. The graphical representation of the comparison may be displayed on graphical user interface 328 in FIG. 3. The graphical user interface may take the form of graphical user interface 500 in FIGS. 5-10, for example.

In this manner, attributes for different network data processing systems may be compared such that a network data processing system for an organization may be selected from potential network data processing systems.

Figure 12:
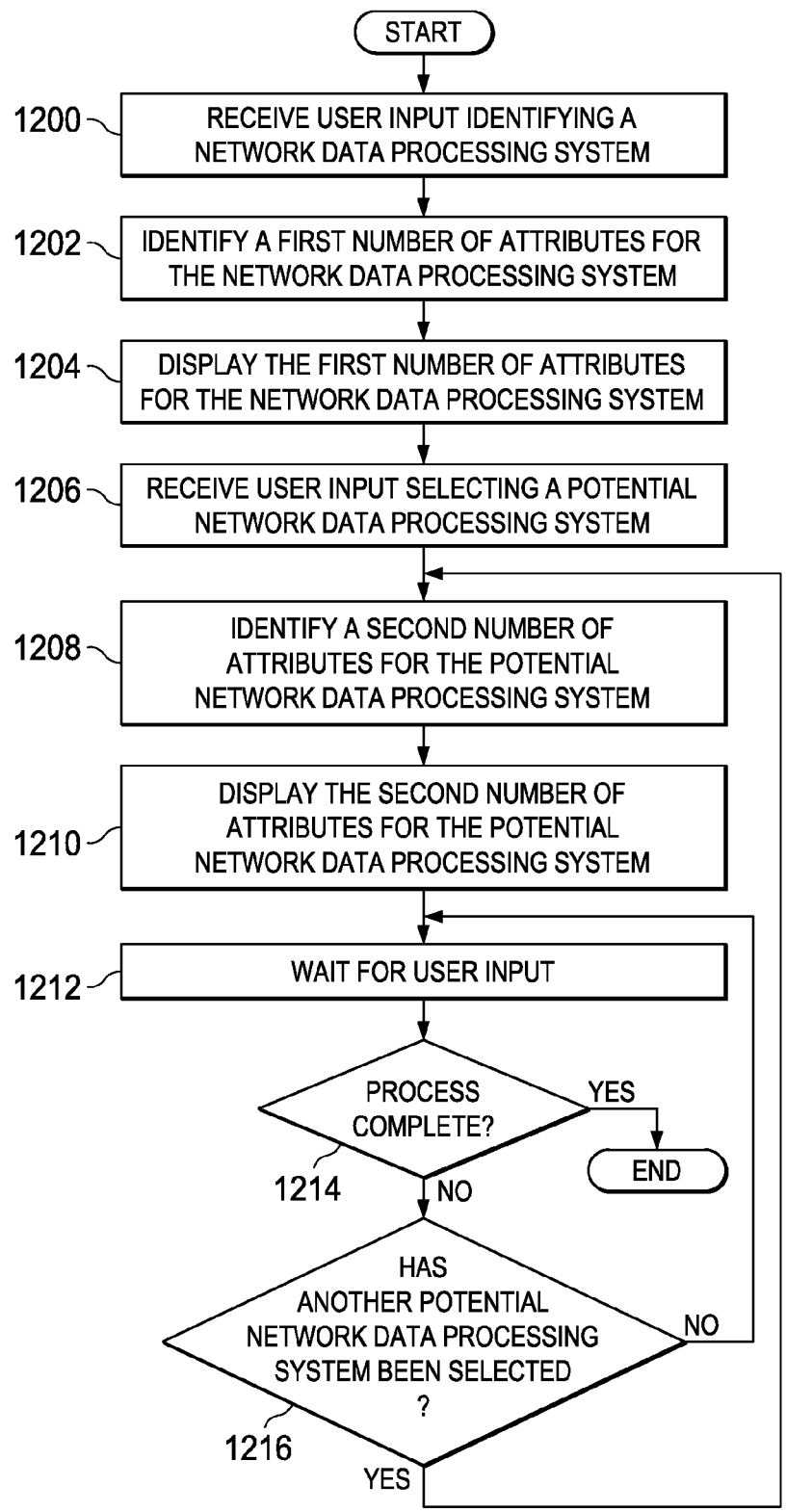
FIG. 12 is an illustration of a flowchart of a process for identifying network processing systems in accordance with an illustrative embodiment.

With reference now to FIG. 12, an illustration of a flowchart of a process for identifying network processing systems is depicted in accordance with an illustrative embodiment. The process illustrated in FIG. 12 may be implemented in identification process 314 in FIG. 3. In particular, the different steps illustrated in FIG. 12 may be implemented in program code that is run by data processing system 200 in FIG. 2.

The process begins by receiving user input identifying a network data processing system (step 1200). In this example, the network data processing system may be a current network data processing system in use or a potential network data processing system that is being considered. This user input and other user input in this process are received through a graphical user interface, such as graphical user interface 346 in FIG. 3. Graphical user interface 500 in FIGS. 5-10 is an example of one implementation of graphical user interface 346 that may be used to receive this and other user input.

Thereafter, a first number of attributes for the network data processing system is identified (step 1202). The process then displays the first number of attributes for the network data processing system (step 1204). This display takes the form of a plot and graphical indicator, such as plot 514 and graphical indicators 504 in FIG. 5.

Thereafter, the process receives user input selecting a potential network data processing system (step 1206). The process then identifies a second number of attributes for the potential network data processing system (step 1208). The process displays the second number of attributes for the potential network data processing system (step 1210). In these illustrative examples, the graphical indicators in the graphical user interface may present the second number of attributes in place of the first number of attributes. The plot may include a plot for both the network data processing system and the potential network data processing system in these illustrative examples. This overlap may provide a capability to identify the advantages and disadvantages of each network being considered.

The process then waits for user input (step 1212). When user input is received, a determination is made as to whether the process is complete (step 1214). If the process is complete, the process terminates. Otherwise, the process determines whether another potential network data processing system has been selected (step 1216). If another potential network data processing system has been selected, the process returns to step 1208 as described above. Otherwise, the process returns to step 1212 to wait for additional user input.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be performed substantially concurrently, or the blocks may sometimes be performed in the reverse order, depending upon the functionality involved.

For example, in some illustrative embodiments, the displaying of attributes for the network data processing system may be performed at the same time the second attributes are displayed.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction processing system. For the purposes of this description, a computer usable or computer readable medium can be any tangible apparatus that can contain, store, communicate, propagate, or transport the program for use by or in connection with the instruction processing system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual processing of the program code, bulk storage, and cache memories, which provide temporary storage of at least some program code in order to reduce the number of times code must be retrieved from bulk storage during processing of the program code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening private or public networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for identifying network data processing systems, the method comprising:

identifying, by a processor unit, a first number of attributes corresponding to an in-house network data processing system;

identifying, by the processor unit, a second number of attributes corresponding to a third party managed network data processing system, wherein the third party managed network data processing system includes hardware structural changes to the in-house network data processing system, and wherein the first number of attributes and the second number of attributes are selected from at least one of time-to-value that is a measure of a time when a value of a change to a particular network data processing system is achieved, risk mitigation that is a measure of an ability to reduce risks associated with the change to the particular network data processing system, cost savings that is a measure of costs associated with the particular network data processing system as compared to costs associated with a current network data processing system, and coverage that is a measure of a range of processes covered by the particular network data processing system in achieving a particular goal for the particular network data processing system;

displaying, on a display device, a graphical user interface with a graphical representation of a visual comparison of the first number of attributes corresponding to the in-house network data processing system and the second number of attributes corresponding to the third party managed network data processing system and with a number of hardware products that structurally changes the in-house network data processing system to the third party managed network data processing system, wherein a first number of values for the first number of attributes and a second number of values for the second number of attributes are displayed in the graphical user interface on a radar plot having a center with values increasing away from the center for the graphical representation of the visual comparison of the first number of attributes and the second number of attributes; and responsive to a selection of a hardware product in the number of hardware products displayed in the graphical user interface, displaying, on the display device, a technical specification document regarding a selected hardware product that structurally changes the in-house network data processing system to the third party managed network data processing system.

2. The method of claim 1, wherein the step of displaying, on the display device, the graphical user interface with the graphical representation of the comparison of the first number of attributes corresponding to the in-house network data processing system and the second number of attributes corresponding to the third party managed network data processing system and with the number of products that structurally changes the in-house network data processing system to the third party managed network data processing system further comprises:

displaying, on the display device, the graphical user interface also with a number of graphical meters that indicate a value for at least one of each of the first number of attributes and the second number of attributes.

3. The method of claim 1, wherein the step of responsive to the selection of the product in the number of products displayed in the graphical user interface, displaying, on the display device, the technical specification document regarding the selected product that structurally changes the in-house network data processing system to the third party managed network data processing system comprises:

responsive to the selection of the product in the number of products displayed in the graphical user interface, retrieving, by the processor unit, a web page with the technical specification document regarding the selected product that structurally changes the in-house network data processing system to the third party managed network data processing system; and displaying, on the display device, the web page.

4. The method of claim 1, wherein the in-house network data processing system is selected from one of a current network data processing system and a potential network data processing system.

5. A data processing system for identifying changes between network data processing systems, the data processing system comprising:

a bus;

a communications unit connected to the bus;

a storage device connected to the bus, wherein the storage device stores program code; and a processor unit connected to the bus, wherein the processor unit runs the program code to identify a first number of attributes corresponding to an in-house network data processing system; identify a second number of attributes corresponding to a third party managed network data processing system, wherein the third party managed network data processing system includes hardware structural changes to the in-house network data processing system, and wherein the first number of attributes and the second number of attributes are selected from at least one of time-to-value that is a measure of a time when a value of a change to a particular network data processing system is achieved, risk mitigation that is a measure of an ability to reduce risks associated with the change to the particular network data processing system, cost savings that is a measure of costs associated with the particular network data processing system as compared to costs associated with a current network data processing system, and coverage that is a measure of a range of processes covered by the particular network data processing system in achieving a particular goal for the particular network data processing system;

display a graphical user interface with a graphical representation of a visual comparison of the first number of attributes corresponding to the in-house network data processing system and the second number of attributes corresponding to the third party managed network data processing system and with a number of hardware products that structurally changes the in-house network data processing system to the third party managed network data processing system, wherein a first number of values for the first number of attributes and a second number of values for the second number of attributes are displayed in the graphical user interface on a radar plot having a center with values increasing away from the center for the graphical representation of the visual comparison of the first number of attributes and the second number of attributes;

and display a technical specification document regarding a selected hardware product that structurally changes the in-house network data processing system to the third party managed network data processing system in response to a selection of a hardware product in the number of hardware products displayed in the graphical user interface.

6. The data processing system of claim 5, wherein in running the program code to display the graphical user interface with the graphical representation of the comparison of the first number of attributes corresponding to the in-house network data processing system and the second number of attributes corresponding to the third party managed network data processing system and with the number of products that structurally changes the in-house network data processing system to the third party managed network data processing system, the processor unit runs the program code to display the graphical user interface also with a number of graphical meters that indicate a value for at least one of each of the first number of attributes and the second number of attributes.

7. The data processing system of claim 5, wherein in running the program code to display the technical specification document regarding the selected product that structurally changes the in-house network data processing system to the third party managed network data processing system in response to the selection of the product in the number of products displayed in the graphical user interface, the processor unit runs the program code to retrieve a web page with the technical specification document regarding the selected product that structurally changes the in-house network data processing system to the third party managed network data processing system in response to the selection of the product in the number of products displayed in the graphical user interface; and display the web page.

8. The data processing system of claim 5, wherein the in-house network data processing system is selected from one of a current network data processing system and a potential network data processing system.

9. A computer program product for identifying changes between network data processing systems, the computer program product comprising:
- a computer recordable storage medium;
  having stored thereon program code for performing the following steps:
  identifying a first number of attributes corresponding to an in-house network data processing system;
  identifying a second number of attributes corresponding to a third party managed network data processing system, wherein the third party managed network data processing system includes hardware structural changes to the in-house network data processing system, and wherein the first number of attributes and the second number of attributes are selected from at least one of time-to-value that is a measure of a time when a value of a change to a particular network data processing system is achieved, risk mitigation that is a measure of an ability to reduce risks associated with the change to the particular network data processing system, cost savings that is a measure of costs associated with the particular network data processing system as compared to costs associated with a current network data processing system, and coverage that is a measure of a range of processes covered by the particular network data processing system in achieving a particular goal for the particular network data processing system;
displaying a graphical user interface with a graphical representation of a visual comparison of the first number of attributes corresponding to the in-house network data processing system and the second number of attributes corresponding to the third party managed network data processing system and with a number of hardware products that structurally changes the in-house network data processing system to the third party managed network data processing system, wherein a first number of values for the first number of attributes and a second number of values for the second number of attributes are displayed in the graphical user interface on a radar plot having a center with values increasing away from the center for the graphical representation of the visual comparison of the first number of attributes and the second number of attributes; and
displaying a technical specification document regarding a selected hardware product that structurally changes the in-house network data processing system to the third party managed network data processing system in response to a selection of a hardware product in the number of hardware products displayed in the graphical user interface.

10. The computer program product of claim 9, wherein displaying the graphical user interface with the graphical representation of the comparison of the first number of attributes corresponding to the in-house network data processing system and the second number of attributes corresponding to the third party managed network data processing system and with the number of products that structurally changes the in-house network data processing system to the third party managed network data processing system further comprises:
displaying the graphical user interface also with a number of graphical meters that indicate a value for at least one of each of the first number of attributes and the second number of attributes.

* * * * *